United States Patent [19]

Hall

[11] 4,024,897
[45] May 24, 1977

[54] FAIL-SAFE INTERLOCK SYSTEM
[75] Inventor: Loyd Reese Hall, Sarasota, Fla.
[73] Assignee: Allied Chemical Corporation, Morristown, N.J.
[22] Filed: Sept. 18, 1975
[21] Appl. No.: 614,450
[52] U.S. Cl. .............................. 141/392; 137/351; 180/82 R
[51] Int. Cl.² ..................... B65B 3/04; B65B 57/00
[58] Field of Search .... 137/351; 180/82 R, 103 BF; 141/1, 84, 94, 98, 346, 379–381, 392; 222/23, 41, 52; 280/5 D; 340/23 R

[56]  References Cited
UNITED STATES PATENTS

| | | | |
|---|---|---|---|
| 1,960,831 | 5/1934 | Shand | 137/351 X |
| 2,871,872 | 2/1959 | Rowles | 180/103 BF |
| 3,119,406 | 1/1964 | Hartung | 137/351 |
| 3,157,194 | 11/1964 | Stolte | 137/351 |

Primary Examiner—Richard E. Aegerter
Assistant Examiner—Frederick R. Schmidt
Attorney, Agent, or Firm—Patrick L. Henry; Richard A. Anderson

[57] ABSTRACT

A fail-safe interlock system is disclosed for use in conjunction with a truck which has a filler valve for the loading of product, and which eliminates the safety hazard of driving the truck away from a loading facility while a loading hose is still connected to the vehicle's filler valve. Movement of a shield in a direction which permits clear access to the end of the filler valve causes the vehicle's ignition circuit to be broken, thereby preventing driving of the truck while the loading hose is connected to the end of the filler valve; and correspondingly, movement of the shield in the opposite direction to where it at least partially covers the end of the filler valve causes the restoration of the ignition circuit, thereby permitting driving of the vehicle after the loading hose has been safely disconnected.

8 Claims, 4 Drawing Figures

FAIL-SAFE INTERLOCK SYSTEM

BACKGROUND OF THE INVENTION

This invention relates to a motor vehicle with a tank for transporting fluids and is directed to means to eliminate the safety hazard of operating the motor vehicle while the tank is connected with a source for replacement. While the invention is broadly applicable for its purpose, it is being initially applied to a tank truck for transporting a liquid petroleum gas such as butane under relatively high pressure.

The loading facility has a supply line extending from the bulk storage tank line. A loading hose, which generally varies in length from 10 to 20 feet, is permanently attached at one end to the supply line. Tank trucks which stop to receive a supply of butane from a loading facility ordinarily have a filler valve for each tank to be loaded. A loading hose is mechanically connected to each filler valve by means of a nozzle on the free end of the hose which mates with the filler valve in a positive manner, for instance by screw threads. There are at least two on/off valves to permit flow of the butane. One is located near the bulk storage tank, and the other is located downstream from the filler valve. A third on/off valve would exist if the tank truck has twin barreled tanks with a filler valve on each, and would be located downstream of the second filler valve. The tank truck's operator connects the loading hose and the filler valve and then turns all on/off valves on. When the tanks are filled, the on/off valves are turned off and the loading hose then disconnected. A potential hazard evolves if the tank truck's operator attempts to drive off while the loading hose and the filler valve(s) are still connected. Under the best circumstances, the on/off valves would have been turned off while the loading hose was still connected. This might result in damage to the truck tank or to the loading hose, or it might result in ruptured piping to create a leak. Under the worst circumstances, the on/off valves would be left in the on position while the loading hose was still connected. The combination of a highly inflammable, pressurized fluid with a running engine, whereby a hot exhaust or spark could ignite the fluid and result in a violent explosion and/or intense fire, could be catastrophic.

U.S. Pat. No. 2,847,023 discloses means to immobilize a tank truck or to prevent operation of a tank truck as long as any such hose connection exists for either delivery from or replenishment of the truck's tank. The safety system is actuated by either removal of the delivery hose nozzle from its normal transportation position on the truck or by change to the operative state of the refill inlets; actuation results in application of the vehicle's wheel brakes to prevent operation of the truck. The system has several disadvantages. The number of parts increases the probability of parts failure. Location of parts makes access for repair more difficult. An added independent act is required, i.e., manual operation of a release valve to permit release of the rear wheel brakes, before the tank truck can be restarted. If the actuating plunger fails to retract sufficiently to place the brake line from the brake pedal in communication with the rear brakes, the operator of the tank truck may only have use of the front wheel brakes, a true driving hazard. Also, the second form of the invention (see FIG. 3) has no means provided for prevention of accidental ignition caused by the operation of electrical equipment in a highly hazardous atmosphere (i.e., use of three switches, a solenoid, and control circuits around butane). Electrical equipment which yields sparks and/or arcs during the operative state, e.g., switches and circuit breakers, can, when used in close proximity to or in conjunction with flammable gases or combustible dusts, cause ignition if there is a suitable mixture with air. Heat producing devices, such as the aforementioned motors, are problematic, as are parts of the electrical equipment which experience insulation failure, e.g., solenoids and wiring. Therefore, the utmost care must be exercised when using electrical devices and wiring around hazardous gases and vapors such as butane and gasoline. With further reference to the second form of the invention (and FIG. 3), an electrical fault in the wiring circuit would prevent actuation of the system, and the tank truck could be driven off while the loading hose is still connected.

U.S. Pat. No. 2,002,757 discloses a system which precludes the possibility of dispensing liquid when the motor of the truck is in operation. A pressure operated electrical switch is incorporated in conjunction with the ignition circuit for the motor truck engine, and this switch is so associated with the hydraulic valve system that when the actuator is operated to effect opening of one of the valve units, the ignition circuit of the engine is rendered inoperative. Thus, operation of the truck is precluded when the valve units are open. However, when the valve units are closed the truck can be driven off, even though the hose is still connected. Also, there is no mention of protection during loading of the tanks.

The present invention safely overcomes these hazards and disadvantages in an economical, simplistic, and fail-safe fashion.

SUMMARY OF THE INVENTION

The present invention provides a fail-safe interlock system for use in conjunction with a truck which has a filler valve for the loading of product, and eliminates the safety hazard of driving the truck away from a loading facility while a loading hose is still connected to the vehicle's filler valve. The essential elements are support means, mounting means, actuating means, and free rotation inhibiting means. The acutating means comprises pivot means, shield means, motion imparting means, and circuit breaking means. The pivot means comprises a shaft which is rotatably mounted on the mounting means, which is in turn secured to the support means. The shield means comprises at least one arm, through one end of which the shaft passes. Thus, the arm(s) can rotate about the shaft at one end. At the other end the arm(s) terminate in a shield, the dimensions and relative positions of the arm(s) and the shield being such that the shield at least partially covers the end of the filler valve which connects to the loading hose when rotation of the arm(s) occurs in one direction about the shaft. The motion imparting means is located adjacent to one of the arm(s) and is caused to move by the rotation of the arm(s) about the shaft. The circuit breaking means is positioned adjacent to the motion imparting means. The rotation of the arm(s) in one direction, whereby the shield provides complete access to the end of the filler valve which connects to the loading hose, causes the motion imparting means to contact the circuit breaking means in such a way that the ignition circuit is broken. The free rotation inhibiting means is positioned so as to prevent a complete rotation of the arm(s) when access to the end of the filler valve is cleared by movement of the arm(s) in that direction. Movement of the shield in a direction to effectuate clear access to the end of the filler valve causes the ignition circuit to be broken, and thus prevents driving of the truck while the loading hose is connected to the end of the filler valve. And movement of the shield in the opposite direction to at least partially cover the end of the filler valve will cause the ignition circuit to be restored, thus permitting driving of the truck. As the loading hose must be disconnected from the end of the filler valve in order for the shield to be brought into this latter position, the safety hazard of driving the truck away while still connected is eliminated. Short of intentional interference, this system is fail-safe.

In the preferred embodiment, the fail-safe interlock system is used in conjunction with a truck which carries a highly inflammable, pressurized fluid. The essential elements are support means, mounting means, actuating means, and free rotation inhibiting means. The support means comprises a portion of the filler valve which is not necessary for forming a connection with the loading hose. The mounting means, which is secured to the support means, comprises a mounting plate and means for securing the mounting plate about the support means. The mounting plate is shaped so that it can encircle the support means. To facilitate mounting, the mounting plate has a split therethrough which is large enough to allow it to be opened and placed about the support means. On either side of the split, the mounting plate has a projection extending outwardly and approximately perpendicularly therefrom. Means is provided for attaching these projections to one another in order to secure the mounting plate snugly about the support means. The acutating means comprises pivot means, shield means, motion imparting means, and circuit breaking means. The pivot means comprises a shaft which is rotatably mounted on the mounting plate. The shield means comprises two arms. Through one end of each of the two arms is passed the shaft, the arms being capable of rotation thereabout. At their other ends, the two arms terminate in a shield. The arms and the shield are positioned relative to each other and have dimensions such that rotation of the arms about the shaft in one direction will result in the shield at least partially covering the end of the filler valve which is adapted for connection to the loading hose. The motion imparting means comprises a cam which is eccentrically secured to one of the arms and adjacent thereto. The rotation of the arms about the shaft causes the cam to turn with the arm to which it is secured. The circuit breaking means comprises a spring pressed guide, an explosion proof switch, and sealing means. The spring pressed guide has two ends, one of which is flat and supports a pin and the other of which is curved and positioned adjacent to the edge of the cam. The explosion proof switch, which is air and water impervious for safety reasons, comprises a housing within which a portion of the ignition circuit passes. The housing has a tube extending therefrom which receives the pin therein. The pin first passes through a compression spring and then into the tube. When the cam is caused to turn by rotation of the arms about the shaft and the edge of the cam brings sufficient pressure against the spring pressed guide, the pin will slide into contact with and break the ignition circuit. When the arms rotate about the shaft in the opposite direction, causing the cam to turn with them, the pin will retract out of contact with and thereby restore the ignition circuit. The sealing means, which are located at the tube, are air and water impervious, yet permit free movement of the pin in the tube. The compression spring has a diameter which is large enough to prevent its entrance into the tube beyond the sealing means, and it bears against the flat end of the spring pressed guide and against a portion of the tube on the side of the sealing means closer to the cam. The free rotation inhibiting means comprises a stop which is located on the mounting plate adjacent to one of the arms. The stop functions to prevent a complete rotation of the arms about the shaft when they are moved in a direction to permit clear access to the end of the filler valve. Thus, movement of the shield in a direction which permits clear access to the end of the filler valve will cause the ignition circuit to be broken, thereby preventing driving of the truck while the loading hose is connected to the end of the filler valve. And correspondingly, movement of the shield in the opposite direction to where it at least partially covers the end of the filler valve will cause the restoration of the ignition circuit, thereby permitting driving of the truck after the loading hose has been safely disconnected from the end of the filler valve.

DETAILED DESCRIPTION OF THE DRAWINGS

Figure 1:
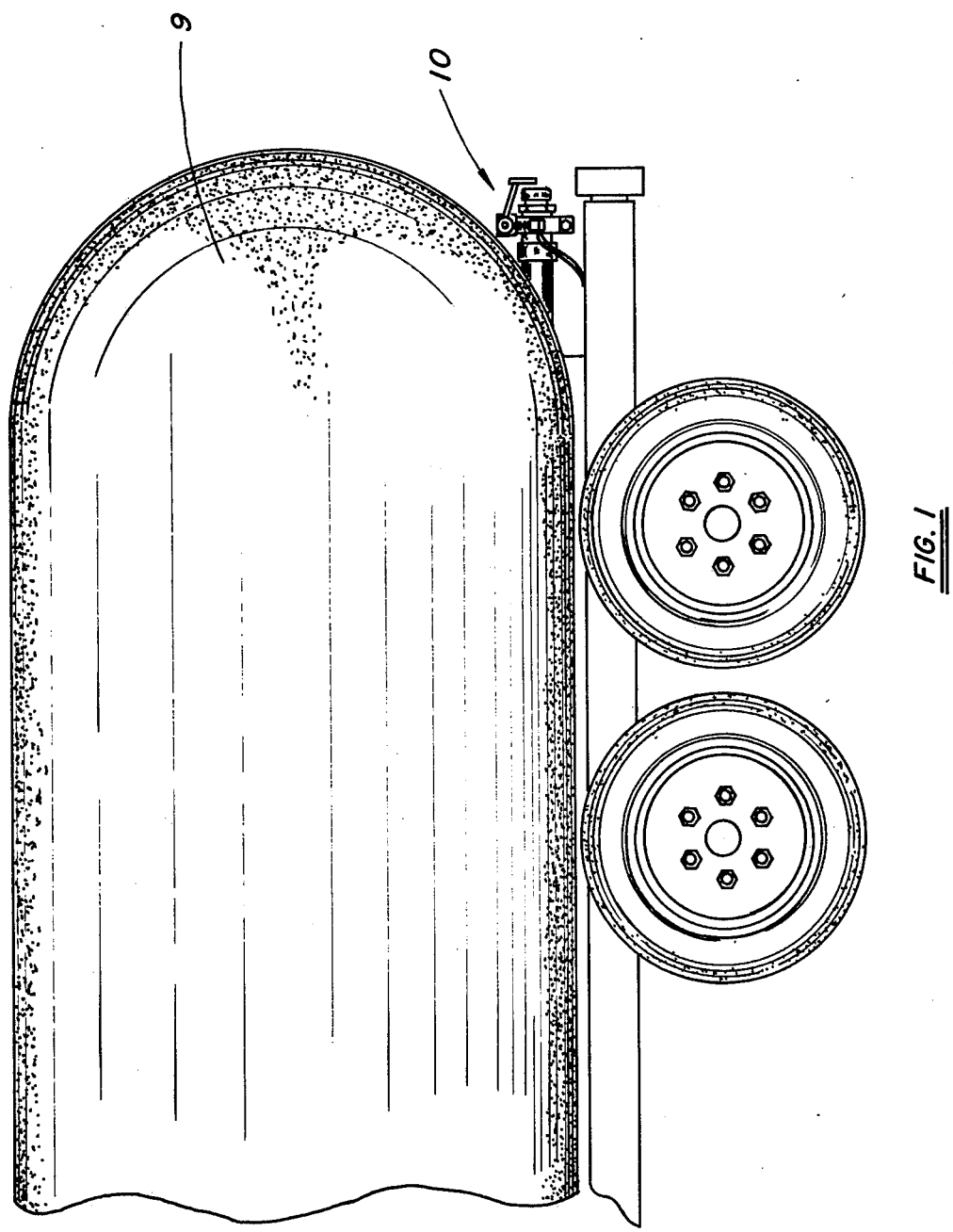
FIG. 1 is a partial schematic view of a motor truck, to which the system of the present invention has been applied.

In the accompanying drawings, like numbers indicate like apparatus. A tank truck 9 which stops to receive a product, such as butane, ordinarily has a filler valve 10 located on the back of the truck for each tank to be loaded. A loading hose 11 is mechanically connected to each filler valve 10, after cap 32 has been removed, by means of a nozzle on the free end of the loading hose 11 which mates with the filler valve 10 in a positive manner, for instance by screw threads. The essential elements of the present invention are support means, mounting means, actuating means, and free rotation inhibiting means.

One of the advantages of the present invention is the ease with which existing tank trucks are adapted for its use. It is preferred that the support means be some portion of the filler valve 10 which is not necessary for forming a connection with the loading hose 11. However, the filler valves of some tank trucks are too short to provide a shoulder for adequate support. In such a situation, the support means can be formed by providing an extension to the filler valve 10, and can comprise any portion of the filler valve 10 and the extension which is not necessary for forming a connection with the loading hose 11. This unit would be functionally the same as the original filler valve 10 and would simply supply additional surface area for support of the remainder of the invention. In the accompanying drawings, no extension has been provided, and the support means comprises a portion 12 of bobtail filler valve 10. Bobtail filler valve 10 can be, for instance, a double-check filler valve such as that manufactured by Bastian-Blessing, a division of Astro Controls, Inc., under the name RegO 6587 2" NPT. There is a female connector (not shown) at truck 9's tank into which bobtail filler valve 10 is screwed.

Figure 2:
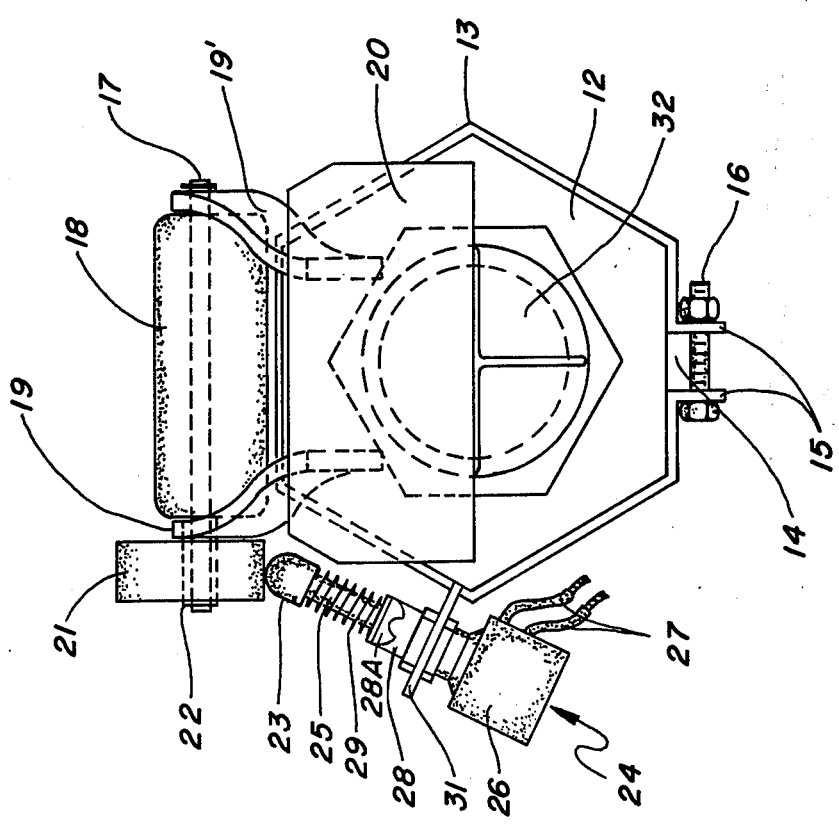
FIG. 2 is a front view of the invention with the ignition circuit intact.

The mounting means comprises a mounting plate 13 and means for securing the mounting plate 13 about the support means. In the preferred embodiment, mounting plate 13 is shaped so that it can encircle the support means. In the drawings, the mounting plate 13 is hexagonal in shape so as to conform to the periphery of portion 12 comprising the support means. To facilitate mounting, mounting plate 13 has a split 14 (see FIG. 2) therethrough which is large enough to allow mounting plate 13 to be opened and placed about the support means. On either side of split 14, mounting plate 13 has a projection 15 extending outwardly and approximately perpendicularly therefrom. Means 16 is provided for attaching projections 15 to one another in order to secure mounting plate 13 snugly about the support means, and can, for example, be fastening or holding screws. Alternately, mounting plate 13 can have more than one split 14, and need not have any splits if it is mounted in some fashion on the support means other than by encircling same.

The actuating means comprises pivot means, shield means, motion imparting means, and circuit breaking means. The pivot means comprises a shaft 17 which is rotatably mounted on mounting plate 13. As shown in the drawings, this may be accomplished by securely mounting on mounting plate 13 a block 18 through which shaft 17 passes and in which shaft 17 may freely rotate. The shield means comprises two arms, 19 and 19', through one end of which shaft 17 passes. The arms, 19 and 19', can rotate about shaft 17, and are prevented from coming off shaft 17 by some suitable means, for instance, by nuts or by flaring the ends of shaft 17. At their other ends, the two arms, 19 and 19', terminate in a shield 20. The arms, 19 and 19', and shield 20 are positioned relative to one another and have dimensions such that rotation of arms, 19 and 19', about shaft 17 in one direction will result in shield 20 at least partially covering the end of bobtail filler valve 10 which is adapted for connection to loading hose 11. The arms, 19 and 19', may be secured to shield 20 in any suitable fashion although they are depicted as set in, and it is possible for arms, 19 and 19', and shield 20 to be molded as one piece. The motion imparting means comprises a cam 21 which is eccentrically secured to arm 19 by a sleeve 22. The rotation of arms, 19 and 19', about shaft 17 causes cam 21 to turn with arm 19 to which it is secured. In alternate embodiments, shaft 17 could also pass through cam 21; cam 21 and arms, 19 and 19', could be fixed to the shaft 17; or a single arm 19 could be used. The circuit breaking means comprises a spring pressed guide 23, an explosion proof switch 24, and sealing means 28A. The spring pressed guide 23 has two ends, one of which is flat and supports a pin 25 and the other of which is curved and positioned adjacent to the edge of cam 21. When shield 20 partially covers the end of bobtail filler valve 10, the curved end of spring pressed guide 23 can be either in sliding contact with the edge of cam 21 or positioned adjacent thereto. The explosion proof switch 24, which for safety reasons is air and water impervious, comprises a housing 26 within which a portion of the ignition circuit 27 passes. The housing 26 has a tube 28 extending therefrom which receives pin 25 therein. Pin 25 first passes through a compression spring 29 and then into tube 28. The sealing means 28A, which is also air and water impervious, is located in tube 28 to prevent entrance of anything except pin 25 thereinto. Pin 25 is free to move in tube 28. Compression spring 29 has a diameter which is large enough to prevent its entrance into tube 28 beyond the sealing means, and it bears against the flat end of spring pressed guide 23 and against a portion of the tube 28 on the side of the sealing means closer to cam 21. The free rotation inhibiting means comprises a stop 30 which is located directly behind arm 19 and can either be affixed to or be a raised portion of mounting plate 13. Stop 30 functions to prevent a complete rotation of arms, 19 and 19', about shaft 17 when they are moved in a direction to permit clear access to the end of bobtail filler valve 10.

Figure 3:
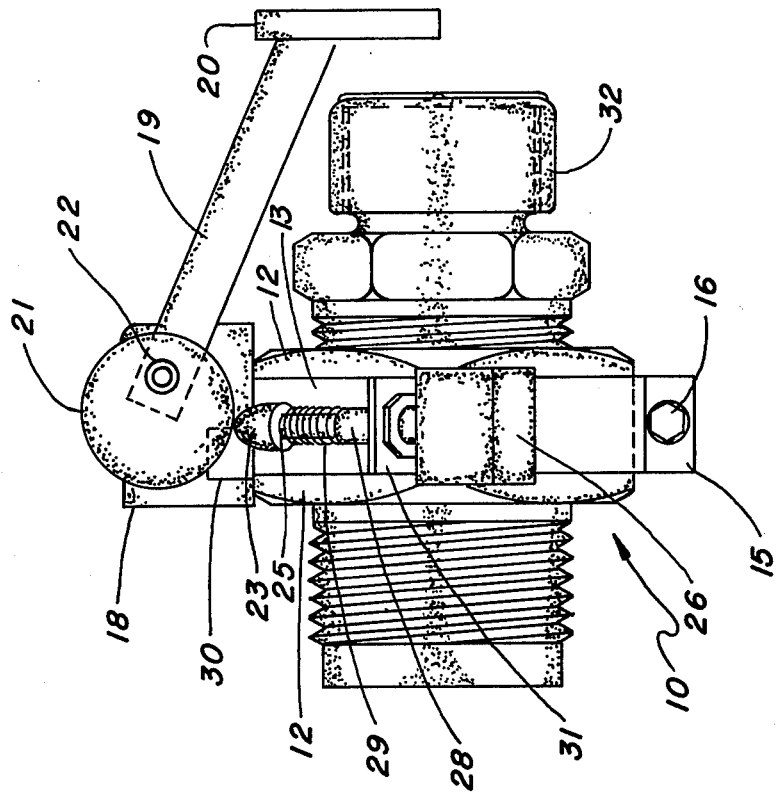
FIG. 3 is a side view of the invention with the ignition circuit intact.
Figure 4:
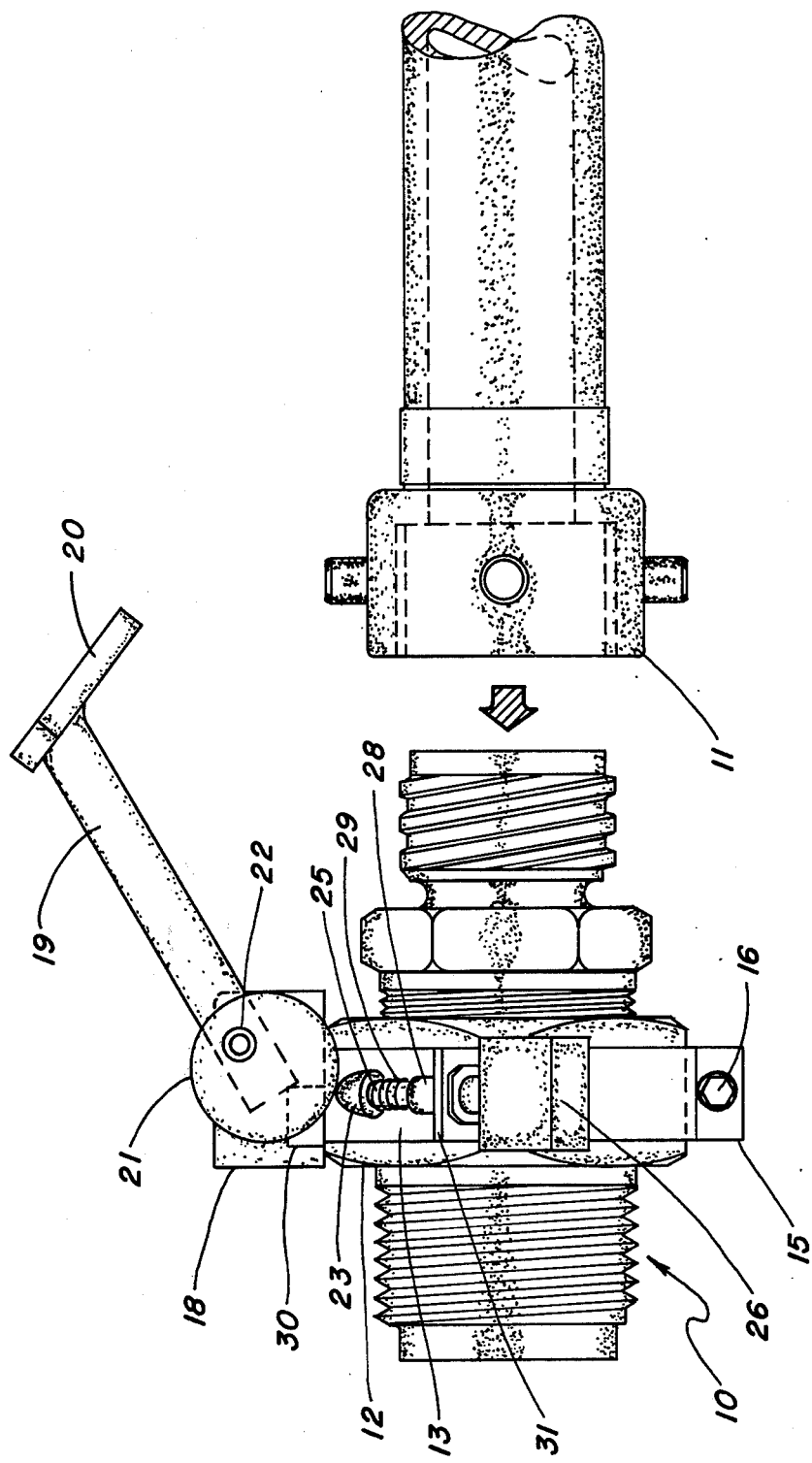
FIG. 4 is a side view of the invention with the ignition circuit broken.

Operation of the invention is as follows. During normal operation of the truck 9, shield 20 is in the down position, i.e., shield 20 partially covers access to bobtail filler valve 10 (see FIGS. 2 and 3) and ignition circuit 27 is intact. In order to connect loading hose 11 to bobtail filler valve 10, shield 20 must be moved out of the way. In the preferred embodiment, shield 20 is lifted (see FIG. 4), which causes the rotation of arms, 19 and 19', and cam 21. When the lower edge of shield 20 has been raised as far as the top of bobtail filler valve 10, the edge of cam 21 brings sufficient pressure on spring pressed guide 23 to push pin 25 into contact with ignition circuit 27 within explosion proof switch 24, thereby breaking the ignition circuit 27. Loading hose 11 is now connected to bobtail filler valve 10. Cam 21 is prevented from turning to a point at which the necessary pressure is reduced in two ways. Should shield 20 fall, due to gravity, back toward its down position after loading hose 11 has been connected, the bottom of shield 20 will come to rest on the top of loading hose 11 or its nozzle and thus be prevented from achieving its down position. Under these circumstances, the edge of cam 21 still bears on spring pressed guide 23 sufficiently to maintain ignition circuit 27 broken. Full rotation of the arms, 19 and 19', and shield 20 in the other direction, to a point where the necessary pressure on spring pressed guide 23 is reduced, is prevented by stop 30 which blocks rotation of arm 19 after a certain point. Stop 30 may not be necessary if the tank truck is designed so as to block rotation of the arms, 19 and 19', and shield 20. Thus, movement of shield 20 in this manner causes ignition circuit 27 to be broken, thereby preventing driving of the truck while loading hose 11 is connected to bobtail filler valve 10. After loading hose 11 is disconnected, either shield 20 will fall to its original down position due to gravity or the operator can pull it down. Cam 21 turns with the arms, 19 and 19', thereby reducing the pressure exerted on spring pressed guide 23. Compression spring 29 pushes the spring pressed guide 23 back toward its normal location and pin 25 retracts out of contact with ignition circuit 27. Thus, movement of shield 20 back to its down position causes restoration of ignition circuit 27, thereby permitting driving of the truck after loading hose 11 has been safely disconnected from bobtail filler valve 10.

If desired, a second mounting plate 31 can be provided to fix the position of tube 28 relative to cam 21. In the drawings, second mounting plate 31 is secured to mounting plate 13 and supports tube 28.

The materials of construction are as follows: for the arms and shield, a temperature resistant, durable plastic capable of withstanding pressure, or a metal such as aluminum or stainless steel, more preferably the latter; for the cam, rolled steel; for the shaft, stainless steel; for the explosion proof switch, stainless steel with the housing encapsulated by plastic; for the screws, carbon steel plated with black oxide to prevent corrosion; for the spring, stainless steel; and for the remainder of the apparatus, a metal such as aluminum or galvanized steel, more preferably the latter.

While the invention has been described primarily in conjunction with the loading of a tank truck with butane, it is not intended to exclude the loading of other trucks with another product. Various modifications and other advantages will be apparent to one skilled in the art, and it is intended that this invention be limited only as set forth in the following claims.

What is claimed is:

1. In combination with a truck having a filler valve for the loading of product, said filler valve having a free end adapted for connection to a loading hose, said loading hose being permanently fixed at its other end to a supply line which leads from a bulk storage tank line, said truck having an ignition circuit, the improvement comprising:
   A. support means on said truck, said support means comprising a portion of said filler valve which does not connect with said loading hose;
   B. mounting means, said mounting means being secured to said support means, said mounting means comprising:
      a. a mounting plate, said mounting plate being of such a shape that it can encircle said support means, said mounting plate having at least one split therethrough, said split being of a size sufficient to permit said mounting plate to be opened at said split and placed about said support means, said mounting plate having a projection on either side of said split, said projections extending outwardly and approximately perpendicularly from said mounting plate, said mounting plate being opened at said split and placed about said support means; and
      b. means for attaching said projections to one another so that said mounting plate can be secured about said support means;
   C. actuating means, said actuating means comprising:
      a. pivot means, said pivot means being secured to said mounting means and comprising a shaft, said shaft being rotatably mounted on said mounting plate;
      b. shield means, said shield means comprising two arms, said shaft passing through one end of each of said arms, said arms being capable of rotation about said shaft, said arms terminating at their other ends in a shield, said arms and said shield being of such dimensions and being positioned relative to each other so that said shield at least partially covers the end of said filler valve which is adapted for connection to said loading hose when said arms rotate about said shaft in one direction;
      c. motion imparting means, said motion imparting means comprising a cam, said cam being located adjacent to one of said arms and being eccentrically secured thereto, said cam being caused to turn with said arm to which it is secured by the rotation about said shaft of said arms; and
      d. circuit breaking means, said circuit breaking means comprising a spring pressed guide, an explosion proof switch, and sealing means, one of the ends of said spring pressed guide being flat and supporting a pin, the other end of said spring pressed guide being curved, the curved end of said spring pressed guide being positioned adjacent to the edge of said cam, said explosion proof switch being water and air impervious and comprising a housing within which a portion of said ignition circuit passes, said housing having a tube extending therefrom which receives therein said pin, said pin first passing through a compression spring, said pin being capable of sliding into contact with and breaking said ignition circuit when said edge of said cam is caused to turn and bring sufficient pressure against said spring pressed guide, said pin being capable of retraction out of contact with and thereby restoring closure of said ignition circuit when said cam is caused to turn in the opposite direction, said sealing means being located at said tube and being water and air impervious while permitting the free movement of said pin in said tube, said compression spring having a diameter large enough to prevent its entrance into said tube beyond said sealing means, said compression spring bearing against said flat end of said spring pressed guide and against a portion of said tube on the side of said sealing means closer to said cam; and
   D. free rotation inhibiting means, said free rotation inhibiting means comprising a stop, said stop being located on said mounting plate adjacent to one of said arms, said stop functioning to prevent a complete rotation of said arms when said arms are moved in a direction to permit clear access to said end of said filler valve;
whereby movement of said shield in a direction which permits clear access to said end of said filler valve causes said ignition circuit to be broken and functions to prevent driving of said truck while said loading hose is connected to said end of said filler valve, and whereby movement of said shield in the opposite direction to where said shield at least partially covers said end of said filler valve causes the restoration of said ignition circuit and functions to permit driving of said truck after said loading hose has safely been disconnected from said end of said filler valve.

2. In combination with a truck having a filler valve for the loading of product, said filler valve having a free end adapted for connection to a loading hose, said loading hose being fixed at its other end to a supply line which leads from a bulk storage tank line, said truck having an ignition circuit, the improvement comprising:
   A. support means on said truck;
   B. mounting means, said mounting means being secured to said support means;
   C. actuating means, said actuating means comprising:
      a. pivot means, said pivot means being secured to said mounting means and comprising a shaft, said shaft being rotatably mounted on said mounting means;
      b. shield means, said shield means comprising at least one arm, said shaft passing through one end of said arm(s) and about which said arm(s) can rotate, said arm(s) terminating at the other end in a shield, said arm(s) and said shield being of such dimensions and being positioned relative to each other so that said shield at least partially covers said end of said filler valve which is adapted for connection to said loading hose when rotation of said arm(s) occurs about said shaft in one direction;

c. motion imparting means, said motion imparting means being located adjacent to one of said arm(s), said motion imparting means being caused to move by the rotation about said shaft of said arm(s); and d. circuit breaking means, said circuit breaking means being positioned adjacent to said motion imparting means, rotation of said arm(s) in a direction, whereby said shield provides complete access to said end of said filler valve which is adapted for connection to said loading hose, causing said motion imparting means to contact said circuit breaking means in such a way that said ignition circuit is broken; and D. free rotation inhibiting means, said free rotation inhibiting means functioning to prevent a complete rotation of said arm(s) when access to said end of said filler valve is cleared by movement of said arm(s) in that direction;

whereby said ignition circuit is broken by the movement of said shield in a direction to clear access to said end of said filler valve and functions to prevent driving of said truck while said loading hose is connected to said end of said filler valve, and whereby closure of said ignition circuit is restored by the movement of said shield in a direction to at least partially cover said end of said filler valve and functions to permit driving of said truck after said loading hose has been disconnected from said end of said filler valve.

3. Apparatus as defined in claim 2 wherein said support means is formed by providing an extension to said filler valve, said support means comprising the portion of said filler valve and said extension which does not connect with said loading hose.

4. Apparatus as defined in claim 2 wherein said mounting means comprises:

a. a mounting plate, said mounting plate being of such a shape that it can encircle said support means, said mounting plate having at least one split therethrough, said split being of a size sufficient to permit said mounting plate to be opened at said split and placed about said support means; and b. means for snugly securing said mounting plate about said support means.

5. Apparatus as defined in claim 2 wherein said arm(s) of said shield means are secured to said shaft and move therewith.

6. Apparatus as defined in claim 5 wherein said motion imparting means comprising a cam, said cam being located adjacent to one of said arm(s) and being eccentrically secured to said shaft.

7. Apparatus as defined in claim 2 wherein said motion imparting means comprises a cam, said cam being located adjacent to one of said arms and being eccentrically secured thereto, said cam being caused to turn with said arm to which it is secured by the rotation about said shaft of said arms.

8. Apparatus as defined in claim 2 wherein said circuit breaking means comprises a spring pressed guide, an explosion proof switch, and sealing means, one of the ends of said spring pressed guide being flat and supporting a pin, the other end of said spring pressed guide being curved, the curved end of said spring pressed guide being positioned adjacent to said motion imparting means, said explosion proof switch being water and air impervious and comprising a housing within which a portion of said ignition circuit passes, said housing having a tube extending therefrom which receives therein said pin, said pin first passing through a compression spring, said pin being capable of sliding into contact with and breaking said ignition circuit when said motion imparting means brings sufficient pressure against said spring pressed guide, said pin being capable of retraction out of contact with and thereby restoring closure of said ignition circuit when said pressure is reduced, said sealing means being located at said tube and being water and air impervious while permitting the free movement of said pin in said tube, said compression spring having a diameter large enough to prevent its entrance into said tube beyond said sealing means, said compression spring bearing against said flat end of said spring pressed guide and against a portion of said tube on the side of said sealing means closer to said spring pressed guide.

* * * * *